United States Patent
Nakajima

(10) Patent No.: US 9,539,878 B2
(45) Date of Patent: Jan. 10, 2017

(54) GLASS TEMPERATURE DETECTING SYSTEM, WINDOW FOG DETECTING SYSTEM, AIR-CONDITIONING SYSTEM FOR VEHICLES, AND WINDOW FOG DETECTING METHOD

(75) Inventor: Hiroshi Nakajima, Hadano (JP)

(73) Assignee: NISSAN MOTOR CO., LTD., Yokohama-Shi (JP)

( * ) Notice: Subject to any disclaimer, the term of this patent is extended or adjusted under 35 U.S.C. 154(b) by 1704 days.

(21) Appl. No.: 11/730,330

(22) Filed: Mar. 30, 2007

(65) Prior Publication Data

US 2007/0235549 A1    Oct. 11, 2007

(30) Foreign Application Priority Data

Apr. 10, 2006    (JP) .................................. 2006-107597

(51) Int. Cl.
- F25B 49/00    (2006.01)
- F25D 21/02    (2006.01)
- F25D 17/00    (2006.01)
- B60H 1/32    (2006.01)
- B60H 1/00    (2006.01)

(52) U.S. Cl.
CPC ...... B60H 1/00785 (2013.01); B60H 1/00864 (2013.01); B60H 1/0075 (2013.01); B60H 1/00642 (2013.01); B60H 1/00792 (2013.01); B60H 2001/3241 (2013.01); B60H 2001/3245 (2013.01); B60H 2001/3255 (2013.01)

(58) Field of Classification Search
CPC ............ B60H 1/00642; B60H 1/00735; B60H 1/0075; B60H 1/00785; B60H 1/00792; B60H 2001/3229; B60H 2001/3241; B60H 2001/3244; B60H 2001/3245; B60H 2001/3255

USPC ... 62/125, 127, 128, 150, 176.1, 176.6, 239; 165/231, 233

See application file for complete search history.

(56) References Cited

U.S. PATENT DOCUMENTS

| | | | | |
|---|---|---|---|---|
| 4,829,884 A | * | 5/1989 | Kagohata | 454/75 |
| 6,407,365 B1 | * | 6/2002 | De Prete, III | 219/203 |
| 6,422,062 B1 | * | 7/2002 | King et al. | 73/29.01 |

(Continued)

FOREIGN PATENT DOCUMENTS

| | | |
|---|---|---|
| EP | 0 928 723 A2 | 7/1999 |
| EP | 1440828 A2 | 7/2004 |

(Continued)

OTHER PUBLICATIONS

Japanese Office Action and the English-language translation.

*Primary Examiner* — M. Alexandra Elve
*Assistant Examiner* — Daniel C Comings
(74) *Attorney, Agent, or Firm* — Foley & Lardner LLP

(57) ABSTRACT

A window fog detecting system for detecting fog on a windshield of a vehicle, including: a glass temperature detecting system including a contact temperature sensor attached to a portion of the windshield on the driver's seat side of the center in a width direction of the windshield, or to a portion where ceramic print is applied on the upper-side periphery of the windshield; a humidity detection device which detects the humidity of air in a vicinity of the inner surface of the windshield; and a judging device which judges the presence of fog on the windshield, on the basis of the detected values of the glass temperature detecting system and the detected values of the humidity detection device.

13 Claims, 7 Drawing Sheets

(56) References Cited

U.S. PATENT DOCUMENTS

| | | |
|---|---|---|
| 6,971,584 B2 | 12/2005 | Schmitt |
| 2003/0169522 A1 | 9/2003 | Schofield et al. |
| 2004/0195343 A1* | 10/2004 | Schmitt et al. .................. 62/80 |
| 2005/0178200 A1* | 8/2005 | Stauss et al. .............. 73/335.02 |

FOREIGN PATENT DOCUMENTS

| | | | |
|---|---|---|---|
| EP | 1 564 044 A1 | 8/2005 | |
| FR | 2 728 514 A1 | 6/1996 | |
| JP | 56-63513 A | 5/1981 | |
| JP | 2-270627 A | 11/1990 | |
| JP | 3-22960 U | 3/1991 | |
| JP | 9-156360 A | 6/1997 | |
| JP | 2000-103323 A | 4/2000 | |
| JP | 2001-219739 A | 8/2001 | |
| JP | 2001-221766 A | 8/2001 | |
| JP | 2001219739 A * | 8/2001 | ............... B60J 1/20 |
| JP | 2003-326936 A | 11/2003 | |
| JP | 2004-066927 A | 3/2004 | |
| JP | 2005-507341 A | 3/2005 | |
| JP | 2005-238921 A | 9/2005 | |
| JP | 2005-241339 A | 9/2005 | |
| JP | 2005-241639 A | 9/2005 | |
| JP | 2006-266809 A | 10/2006 | |
| KR | 2005-0114014 A | 12/2005 | |
| WO | WO 01/81931 A1 | 11/2001 | |
| WO | WO 2006/029901 A1 | 3/2006 | |

\* cited by examiner

GLASS TEMPERATURE DETECTING SYSTEM, WINDOW FOG DETECTING SYSTEM, AIR-CONDITIONING SYSTEM FOR VEHICLES, AND WINDOW FOG DETECTING METHOD

BACKGROUND OF THE INVENTION

1. Field of the Invention

The present invention relates to a glass temperature detecting system that detects the temperature of the windshield of a vehicle, a window fog detecting system, an air-conditioning system for vehicles, and a window fog detecting method.

2. Description of the Related Art

Japanese Patent Application Laid-open Publication No. 2003-326936 discloses a system, which detects window fog on the basis of the temperature of a surface of a windshield of a vehicle, and which defogs the windshield by blowing conditioned air to the windshield from a defroster outlet port.

SUMMARY OF THE INVENTION

In the above-mentioned system, an infrared sensor is used to detect the temperature of the inner surface of the windshield. However, an infrared sensor is expensive, leading to a problem of increase in manufacturing costs.

An object of the present invention is to provide a glass temperature detecting system, a window fog detecting system, an air-conditioning system for vehicles, and a window fog detecting method. In each of the systems and the method, the temperature of the inner surface of a windshield can be detected without using an infrared sensor. In addition, there should be no need to provide anything to cover the portion where the temperature sensor is attached so that the portion cannot be seen from the outside. Moreover, the above systems and method should be provided with reduced manufacturing costs.

A first aspect of the present invention is a glass temperature detecting system for detecting a temperature of an inner surface of a windshield of a vehicle, the glass temperature detecting system comprising a contact temperature sensor, wherein the temperature sensor is attached to a portion of the windshield on the driver's seat side of the center in a width direction of the windshield, or to a portion where ceramic print is applied on the upper-side periphery of the windshield.

A second aspect of the present invention is a window fog detecting system for detecting fog on a windshield of a vehicle, comprising: the above-mentioned glass temperature detecting system; a humidity detection device which detects the humidity of air in a vicinity of the inner surface of the windshield; and a judging device which judges the presence of fog on the windshield, on the basis of the detected values of the glass temperature detecting system and the detected values of the humidity detection device.

A third aspect of the present invention is an air-conditioning system for vehicles comprising: the above-mentioned window fog detecting system; a defogging device which defogs the windshield by using conditioned air blown out from a defroster outlet port; and a control device which controls the defogging device according to the detection result of the window fog detecting system.

A fourth aspect of the present invention is a window fog detecting method of detecting fog on a windshield of a vehicle, the method comprising: detecting a temperature of an inner surface of the windshield with a contact temperature sensor attached to any one of, a portion of the windshield on the driver's seat side of the center in a width direction of the windshield, and a portion where ceramic print is applied on the upper-side periphery of the windshield; detecting the humidity of air in a vicinity of the inner surface of the windshield; detecting the temperature of air in the vicinity of the inner surface of the windshield; and judging the presence of fog on the windshield, on the basis of the detected temperature of the inner surface of the windshield, and the detected temperature and humidity of air in the vicinity of the inner surface of the windshield.

BRIEF DESCRIPTION OF THE DRAWINGS

The invention will now be described with reference to the accompanying drawings wherein.

DETAILED DESCRIPTION OF THE PREFERRED EMBODIMENTS

Figure 1A:
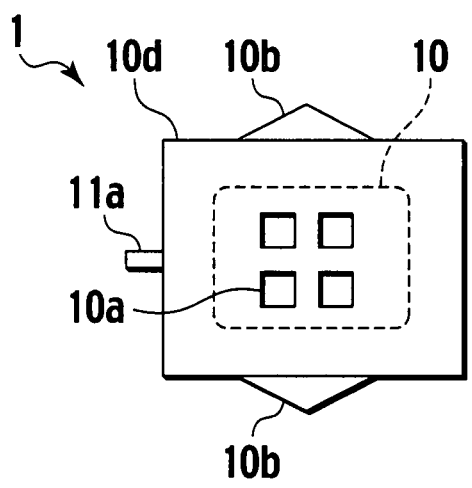
FIG. 1A is a plan view of a sensor unit included in a window fog detecting system according to an embodiment of the present invention.

An embodiment of the present invention will be explained below with reference to the drawings, wherein like members are designated by like reference characters.

Figure 1C:
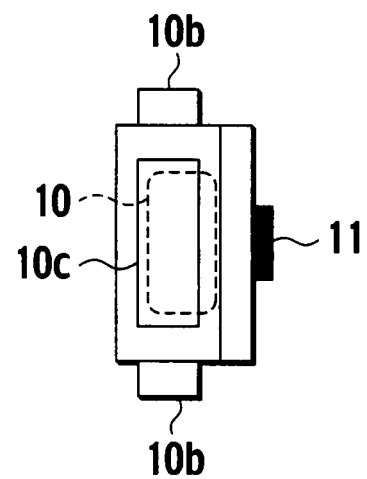
FIG. 1C is a side view of the sensor unit shown in FIG. 1A.
Figure 1B:
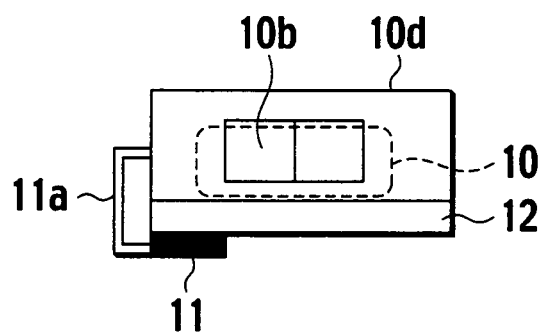
FIG. 1B is a front view of the sensor unit shown in FIG. 1A.

A sensor unit 1 according to the embodiment of the present invention includes a humidity/temperature sensor 10 and a contact temperature sensor 11, as shown in FIGS. 1A to 1C. The humidity/temperature sensor 10 detects the temperature Tga and the humidity RH of air in the passenger compartment (also referred to as inside air) in a vicinity of the inner surface of a windshield 2. The contact temperature sensor 11 detects the temperature Tg of the inner surface of the windshield 2. The humidity/temperature sensor 10 is provided inside a housing 10*d* having a substantially box shape. On the upper surface of the housing 10*d*, holes 10*a* are provided for introducing air to elements of the humidity/temperature sensor 10. To each of the lateral side surfaces of the housing 10*d*, a nail 10*b* is provided for fixation of the unit 1. To one of the other side surfaces of the housing 10*d*, a connector 10*c* is attached. On the bottom surface of the housing 10*d*, an elastic resin film 12 is attached. On the resin film 12, the temperature sensor 11 is fixed. The temperature sensor 11 is a thermistor, and a signal from the temperature sensor 11 is outputted through a harness 11*a*.

Figure 2A:
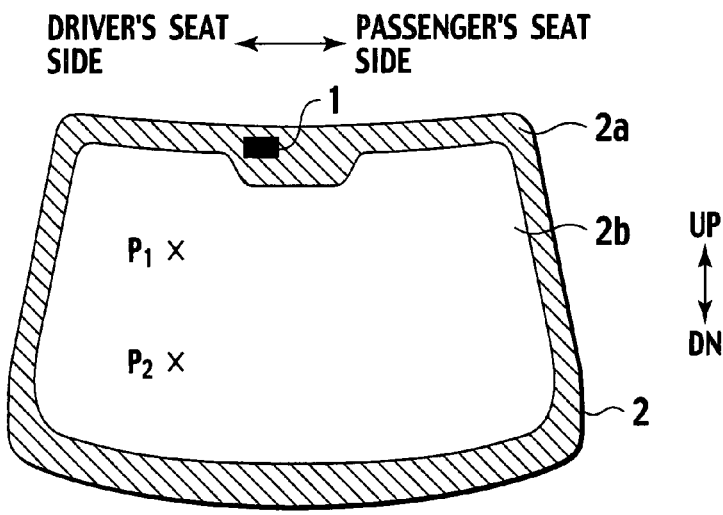
FIG. 2A is a front view of a windshield, where the sensor unit shown in FIGS. 1A to 1C is attached to the upper end portion of the center of the windshield in a width direction of a vehicle.

On the peripheral portion of the windshield 2, as shown in FIG. 2A, a printed portion 2*a* (the shaded portion in FIG. 2A) is formed. In the printed portion 2*a*, ceramic print is applied to a surface on the passenger compartment side of the windshield 2. A non-printed portion 2*b* where ceramic print is not applied is surrounded by the printed portion 2*a*.

The sensor unit 1 is arranged on the printed portion 2*a*, particularly, in an area of the printed portion 2*a*, which is apart from a defroster outlet port, and which is thus not exposed directly to air stream from the defroster outlet port. To be specific, the sensor unit 1 is arranged in the upper end portion of the center of the windshield 2 in a width direction of a vehicle (hereinafter expressed as a vehicle width direction), and in a vicinity of a region where a rearview mirror is attached. In addition, the sensor unit 1 is attached so as to stay within the width of the printed portion 2*a*.

By arranging the sensor unit 1 in the center of the windshield 2 in the vehicle width direction, the temperature Tg of the inner surface of the windshield 2 on both of the driver's seat side and the passenger's seat side, can be detected with higher precision than otherwise.

Defroster outlet ports are provided to the upper surface of an instrument panel in a vicinity of the lower end portion of the windshield 2, and are arranged along the vehicle width direction (not illustrated). Such a defroster is called as a front defroster. By blowing conditioned air from the defroster outlet ports against the windshield 2, the windshield 2 is defogged. A defroster outlet port is also provided to each side end portion of the instrument panel in the vehicle width direction (not illustrated). Conditioned air from the defroster outlet port on each side is blown against a side window. Such a defroster is called as a side defroster. By blowing conditioned air from the defroster outlet port against the side window, the side window is defogged.

Since the sensor unit 1 is attached to the upper end portion of the windshield 2, it is possible to suppress the influence of conditioned air from the defroster outlet port on the detection of the temperature Tg of the inner surface of the windshield 2. As a result, the temperature Tg can be detected with higher precision than otherwise.

Figure 2B:
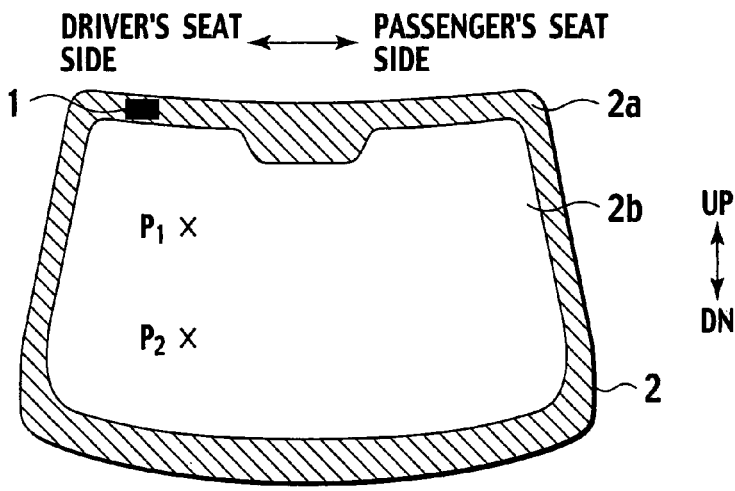
FIG. 2B is a front view of a windshield, where the sensor unit shown in FIGS. 1A to 1C is attached to an upper printed portion of the windshield on the driver's seat side.

Moreover, the sensor unit 1 may be attached to the upper printed portion 2*a* of the windshield 2 on the driver's seat side, as shown in FIG. 2B.

By attaching the sensor unit 1 on the driver's seat side, it is possible to detect the temperature Tg of the inner surface of the windshield 2 on the driver's seat side with higher precision than otherwise. Accordingly, a window defogging operation to be described later can be performed with higher precision than otherwise. As a result, it is possible to check fog on the windshield 2 from disturbing the driver's view. Moreover, by attaching the sensor unit 1 to the printed portion 2*a* on the upper side, it is possible to suppress the influence of conditioned air from the defroster outlet port on the detection of the temperature Tg of the inner surface of the windshield 2. This makes it possible to perform the temperature detection with higher precision than otherwise.

Figure 2C:
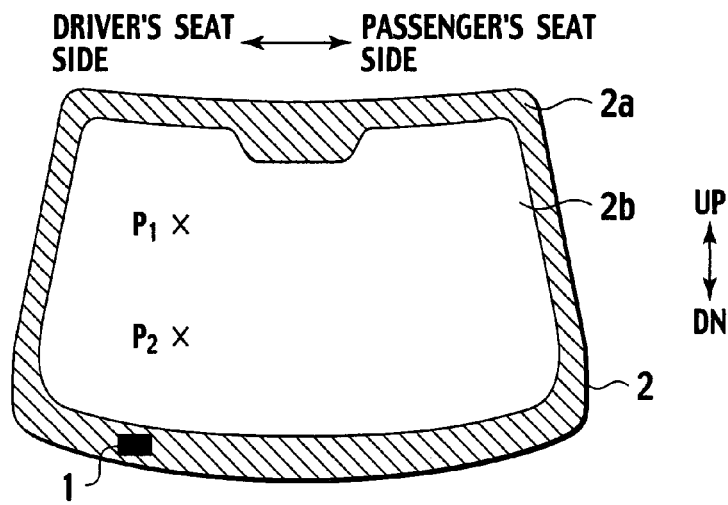
FIG. 2C is a front view of a windshield, where the sensor unit shown in FIGS. 1A to 1C is attached to a lower printed portion of the windshield and on the driver's seat side.

Furthermore, the sensor unit 1 may be attached to the lower printed portion 2*a* of the windshield 2 on the driver's seat side, as shown in FIG. 2C.

In this case as well, by attaching the sensor unit 1 on the driver's seat side, it is possible to detect the temperature Tg of the inner surface of the windshield 2 on the driver s seat side with higher precision than otherwise. Accordingly, the window defogging operation to be described later can be performed with higher precision than otherwise. This makes it possible to check fog on the windshield 2 from disturbing the driver's view.

Figure 3A:
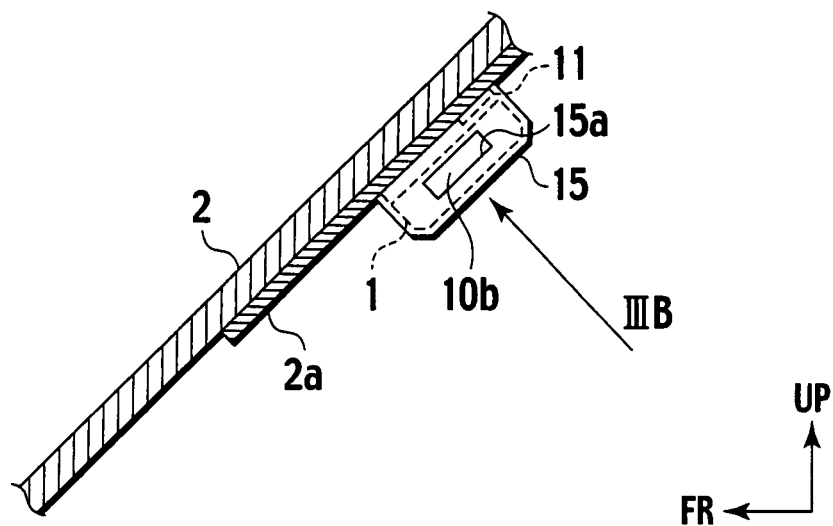
FIG. 3A is a cross-sectional view of a windshield, which shows an attachment structure of the sensor unit shown in FIGS. 1A to 1C.
Figure 3B:
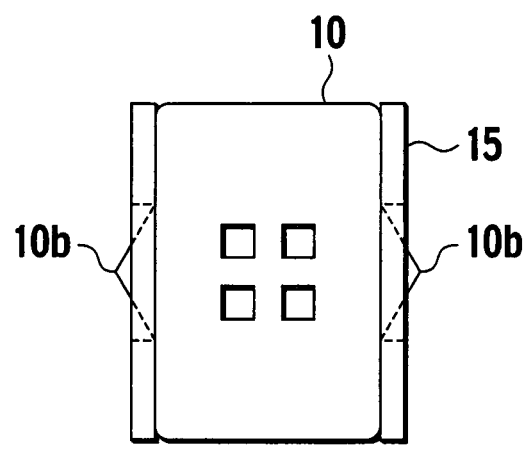
FIG. 3B is a view seen from a direction of an arrow III B shown in FIG. 3A.

To the inner surface of the printed portion 2*a*, as shown in FIGS. 3A and 3B, a bracket 15 made of metal is attached. The bracket 15 supports the housing 10*d* of the sensor unit 1. Engaging holes 15*a* are provided to the bracket 15 so as to correspond respectively to the nails 10*b*. The sensor unit 1 is supported on the printed portion 2*a* with the nails 10*b* engaging respectively with the engaging holes 15*a*. In the state shown in FIG. 3A, the temperature sensor 11 on the bottom surface side of the sensor unit 1 is pressed against, and is thereby in close contact with, the printed portion 2*a* with the resin film 12 in between by the sensor unit 1, which is supported by the bracket 15. This makes it possible to measure with high precision the temperature Tg of the inner surface of the windshield 2 on the printed portion 2*a* with the temperature sensor 11. Incidentally, since the resin film 12 is elastic, the temperature sensor 11 can be closely attached even to the curved surface of the windshield 2.

Figure 4:
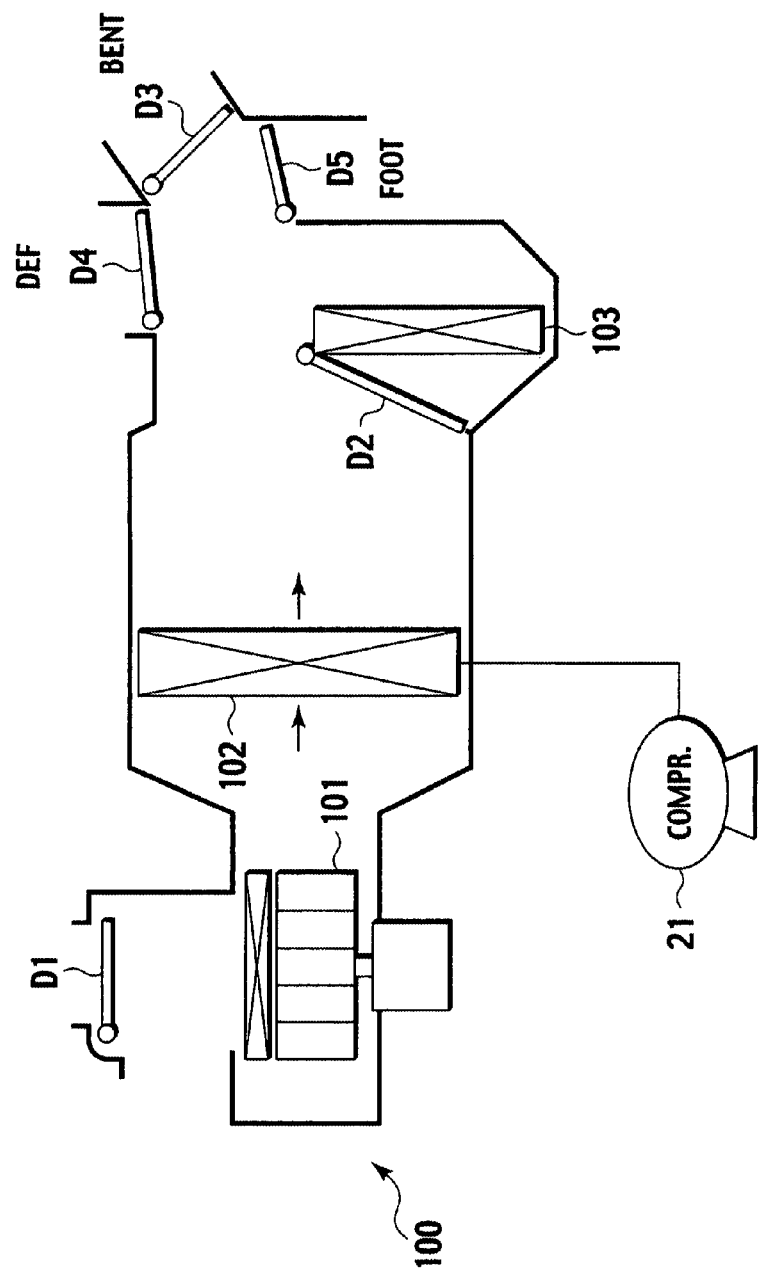
FIG. 4 is a diagram schematically showing a configuration of an air-conditioning unit according to the embodiment.

FIG. 4 shows a schematic configuration of an air-conditioning unit 100 according to the embodiment. When a blower fan 101 rotates, either the inside air or the outside air is drawn into the air-conditioning unit 100 through an inside/outside air switching door D1. By the drive of a compressor 21, a refrigerant is compressed and sent to an evaporator 102. The air having drawn into the air-conditioning unit 100 passes through the evaporator 102, and is dehumidified and cooled therein. Once the air has passed through the evaporator 102, the air stream is divided into, an air stream that passes through a heater core 103, and another air stream that bypasses the heater core 103. The ratio of the two divided streams depends on the opening degree of an air-mix door D2. The air passing through the heater core 103 is heated by the heater core 103. On the other hand, the air bypassing the heater core 103 becomes cooling air as it is.

The air having passed through the heater core 103 and the air having bypassed the heater core 103 are mixed together on the downstream side of the heater core 103. Thereby, conditioned air is generated. The conditioned air passes through a ventilation door D3, a defroster door D4 and a foot door D5, and is then sent to the passenger compartment, respectively from a ventilation outlet port, the defroster outlet port and a foot outlet port, each facing the passenger compartment. Each of the ventilation door D3, the defroster door D4 and the foot door D5 is opened and closed in response to various air-conditioning modes. In a VENTILATION mode, only the ventilation door D3 is opened. In addition, in a DEFROSTER mode, only the defroster door D4 is opened, and in a FOOT mode, only the foot door D5 is opened. In a BI-LEVEL mode, the ventilation door D3 and the foot door D5 are opened. In a DEF/FOOT mode, the defroster door D4 and the foot door D5 are opened. The blower fan 101 and the doors D1 to D5 are driven respectively by actuators 22 (see FIG. 6) such as a motor.

In the embodiment, on the basis of the temperature Tg of the inner surface of the windshield 2, the presence of fog on the windshield 2 is detected. However, the temperature Tg is not uniform over the entirety of the inner surface of the windshield 2, and is different from point to point according to various factors such as solar radiation on the surface of the windshield 2. Specifically, when the windshield 2 is exposed to solar radiation, the temperature of the non-printed portion 2b with no ceramic print applied thereto is likely to be higher than that of the printed portion 2a with ceramic print applied thereto. The more the amount Qsun of solar radiation on the windshield 2 is, the larger the difference in temperature between the non-printed portion 2b and the printed portion 2a becomes. As a result of this, the temperature of the non-printed portion 2b becomes significantly different from that of the printed portion 2a.

Figure 5A:
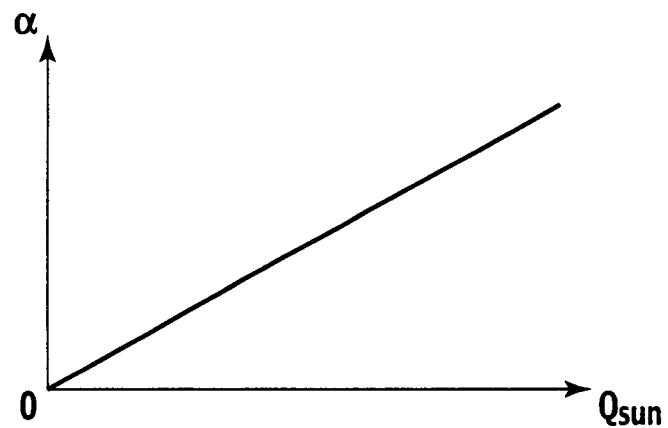
FIG. 5A is a graph showing correction characteristics in a case where the temperature of the inner surface of the windshield is corrected according to the amount of solar radiation.

Accordingly, in the embodiment, the temperature Tg of the inner surface of the windshield 2 is corrected on the basis of the amount Qsun of solar radiation on the windshield 2. The characteristics of a correction value α are set in advance. In the setting, as shown in FIG. 5A, the correction value α for a detected value of the temperature Tg of the inner surface increases as the amount Qsun of solar radiation on the surface of the windshield 2 increases. On the basis of the characteristics, the temperature Tg of the inner surface of the windshield 2 is corrected. Thereby, the surface temperature of the non-printed portion 2b can be calculated with higher precision than otherwise from the surface temperature of the printed portion 2a, that is, the detected value of the temperature sensor 11. It should be noted that the amount Qsun of solar radiation is detected by a solar radiation sensor 13 to be described later.

The temperature Tg of the inner surface of the windshield 2 is affected, not only by solar radiation, but also by conditioned air from the defroster outlet port. The portion on the windshield 2, where the temperature sensor 11 is attached, is apart from the defroster outlet port. Accordingly, since conditioned air from the defroster outlet port is hardly blown against the temperature sensor 11, the influence of the conditioned air is small. On the other hand, on the lower region of the windshield 2, the conditioned air from the defroster outlet port is blown strongly. Accordingly, the conditioned air of the defroster largely affects the temperature Tg of the inner surface. That is, the closer to the defroster outlet port the temperature sensor 11 is, the higher the temperature Tg of the inner surface of the windshield 2 becomes. Moreover, a larger amount or flow rate QDEF of air blown out from the defroster outlet port and a higher outlet air temperature Tao which is the temperature of the air blown out from the defroster outlet port make higher the temperature Tg of the inner surface of the windshield 2.

Figure 5B:
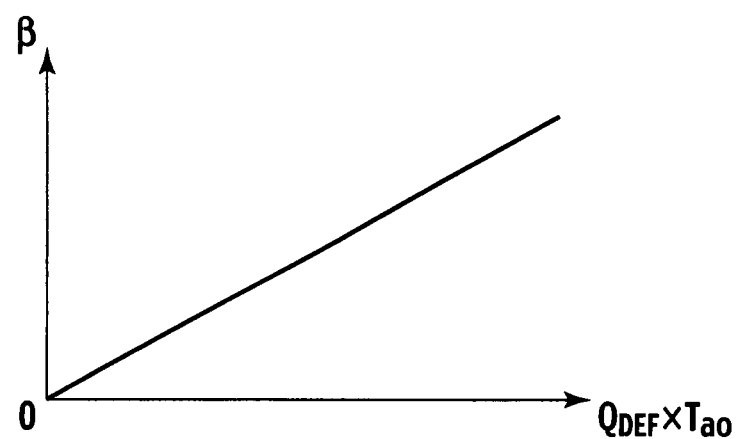
FIG. 5B is a graph showing correction characteristics in a case where the temperature of the inner surface of the windshield is corrected taking the influence of defroster blow into consideration.

Accordingly, in the embodiment, the temperature Tg of the inner surface of the windshield 2 is corrected on the basis of the amount or flow rate QDEF of air blown out from the defroster outlet port and the outlet air temperature Tao. The characteristics of the correction value β are set in advance. In the setting, as shown in FIG. 5B, the correction value β increases as the multiplication value obtained by multiplying the amount or flow rate QDEF of air blown out from the defroster outlet port and the outlet air temperature Tao increases. On the basis of the characteristics, the temperature Tg of the inner surface of the windshield 2 is corrected. In addition, the influence of the conditioned air from the defroster outlet port on the temperature Tg of the inner surface of the windshield 2 changes according to the distance between the defroster outlet port and each point as an observation target on the windshield 2. Accordingly, the characteristics shown in FIG. 5B are set for each point on the windshield 2 (for example, each point of P1 and P2 in FIG. 2A). Comparing P1 with P2 in FIG. 2A, P2 is closer to the defroster outlet port than P1 is. For this reason, P2 is more likely to be affected by the defroster blow than P1 is. As a result, the slope of the correction characteristics of the P2 becomes steeper than that of P1. The characteristics shown in FIG. 5B are not necessarily set over the entirety of the windshield 2. It suffices that the characteristics be set with respect to principal points where it is necessary to observe the occurrence of window fog. It should be noted that, as the amount or flow rate QDEF of air blown out from the defroster outlet port, it is possible to employ a value calculated from the rotating speed of the blower fan 101, a set value of the opening degree of each doors D1 to D5 such as the air-mix door, and the inlet air temperature Tai.

Figure 6:
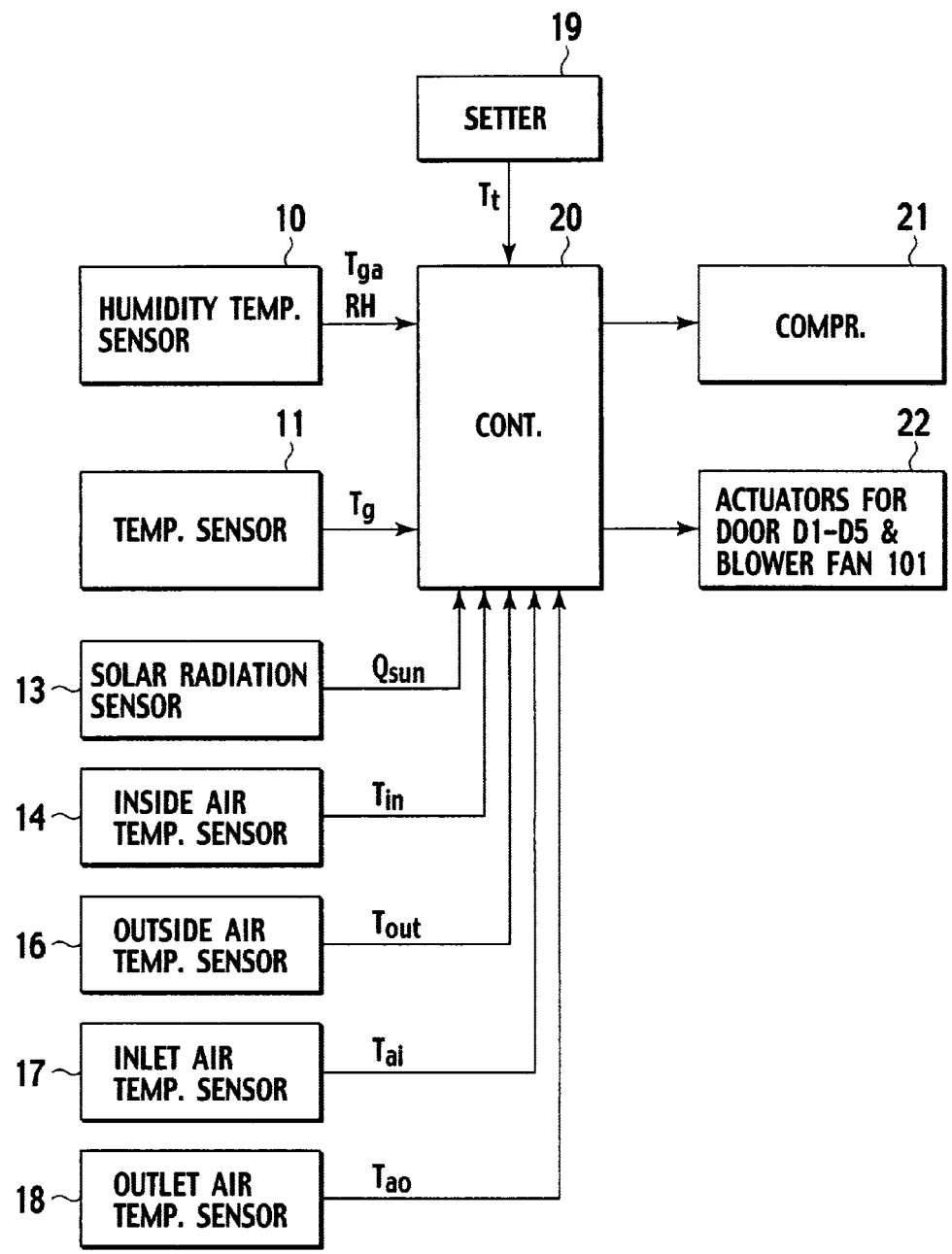
FIG. 6 is a block diagram showing a part of a control configuration of an air-conditioning system for vehicles according to the embodiment.

FIG. 6 is a block diagram showing a part of a control configuration of an air-conditioning system for vehicles according to the embodiment, particularly a part of the control configuration involved in a window defogging control. A controller 20 receives signals Tga and RH from the humidity/temperature sensor 10, and a signal Tg from the temperature sensor 11. On the basis of these signals from the sensors 10 and 11, the controller 20 executes processings which will be described later. Then, the controller 20 outputs control signals, to a compressor 21, and to the actuators 22 for the doors D1 to D5, the blower fan 101 and the like. The controller 20 also receives other signals necessary for the air-conditioning control. Such signals include: a signal from an inside air temperature sensor 14, which detects the temperature Tin of the inside air; a signal from an outside air temperature sensor 16, which detects the temperature Tout of the outside air; a signal from a solar radiation sensor 13, which detects the amount Qsun of solar radiation; a signal from an inlet air temperature sensor 17, which detects the inlet air temperature Tai that is the temperature of air having passed through the evaporator 102; a signal from a setter 19, which sets the target temperature Tt in the passenger compartment; and the like.

Figure 7:
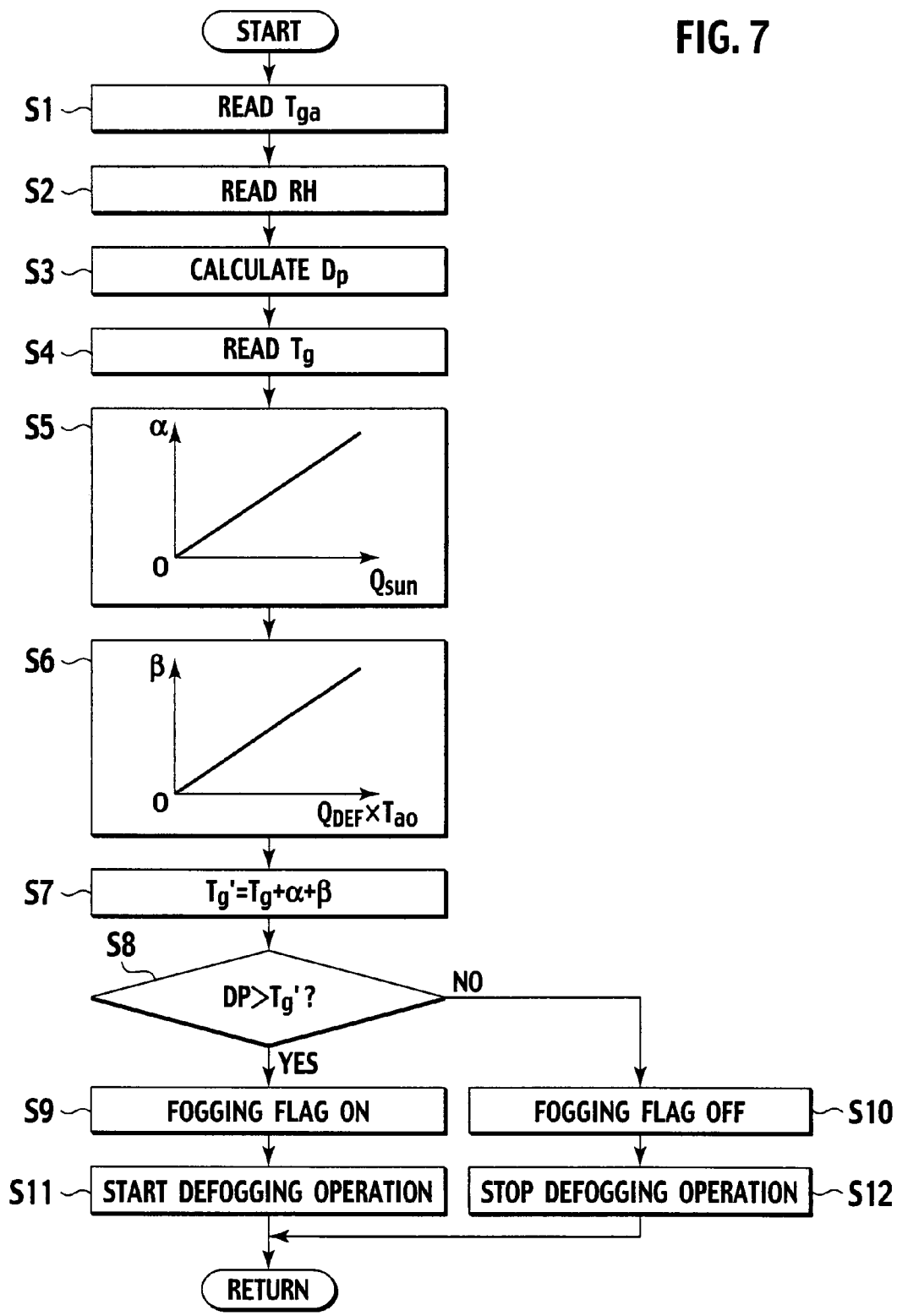
FIG. 7 is a flowchart showing an example of processes in a controller shown in FIG. 6.

FIG. 7 is a flowchart showing an example of a process to be executed by the controller 20. The control of this process is commenced, for example, when a switch for an automatic air-conditioner is turned on. At first, the controller 20 reads the temperature Tga and the humidity RH of air in the vicinity of the inner surface of a windshield 2, which have been detected by the humidity/temperature sensor 10, respectively in Step S1 and Step S2. In Step S3, the controller 20 calculates a dew point temperature DP of air in the vicinity of the inner surface of the windshield 2 from the temperature Tga and the humidity RH. In Step S4, the controller 20 reads the temperature Tg of the inner surface of the windshield 2, which has been detected by the temperature sensor 11.

In Step S5, the controller 20 calculates the temperature correction value α corresponding to the amount Qsun of solar radiation, on the basis of the characteristics shown in FIG. 5A, which are set in advance. In Step S6, the controller 20 calculates the temperature correction value β corresponding to the amount or flow rate QDEF of air blown out from the defroster outlet port and the outlet air temperature Tao, on the basis of the characteristics shown in FIG. 5B, which are set in advance for each point on the windshield 2. In Step S7, the controller 20 adds the temperature correction values α and β to the temperature Tg detected by the temperature sensor 11, and thereby calculates the temperature Tg' of the inner surface after the correction. At this time, the temperature Tg' is calculated for each point on the non-printed portion 2b of the windshield 2.

In Step S8, the controller 20 determines whether or not the temperature Tg' of the inner surface after the correction is lower than the dew point temperature DP. When it is determined that the temperature Tg' of the inner surface after the correction is lower than the dew point temperature DP in Step S8, the controller 20 judges that there is fog on the windshield 2, and then the process proceeds to Step S9. In Step S9, the controller 20 turns a fogging flag on. Subsequently, the controller 20 sends a control signal to, one of, or each of, the compressor 21 and the actuators 22, so as to execute an air-conditioning operation for defogging the window (the window defogging operation). On the other hand, when it is determined that the temperature Tg' of the inner surface after the correction is not less than the dew point temperature DP, the controller 20 judges that there is no fog on the windshield 2, and then the process proceeds to Step S10. In Step S10, the controller 20 turns the fogging flag off. Subsequently, the controller 20 sends a control signal to each of the compressor 21 and the actuators 22, so as to stop the window defogging operation.

Description will be given of the window defogging operation executed in Step S11. In order to defog the window, the dew point temperature DP in the vicinity of the inner surface of the windshield 2 is reduced by sending dry air which has been dehumidified. Alternatively, the temperature Tg' of the inner surface of the windshield 2 is increased by blowing air with relatively high temperature against the windshield 2.

Accordingly, in Step S11, any one of, or a combination of, the following operations (a) to (e), is performed.

(a) The air-conditioning mode is changed to a mode in which conditioned air is blown out from the defroster outlet port, that is, the DEFROSTER mode or the DEF/FOOT mode.

(b) The amount or flow rate QDEF of air blown out from the defroster outlet port is increased by increasing the rotating speed of the blower fan 101.

(c) The outlet air temperature Tao from the defroster outlet port is increased by adjusting the opening degree of the air-mix door D2.

(d) In a case where the inside air circulates in passenger compartment, the outside air is introduced.

(e) Dehumidified air is sent by turning the compressor 21 on.

It should be noted that, in a case where there are a plurality of points to be observed, the points with fog actually occurring may sometimes exist together with the points without fog. In this case, the total amount of fog on the windshield 2 may be calculated from the number of points with fog, and thereby the air-conditioning pattern may be changed according to the calculation result. When the total amount of fog on the windshield 2 is calculated, it is conceivable to weight, more than others, certain points within the driver's field of vision, that is, the points thus important for driving.

According to the embodiment, the following effects can be achieved.

(1) The temperature sensor 11 is attached to the printed portion 2a on the windshield 2, while the sensor 11 is in contact with the portion 2a. Accordingly, the temperature Tg of the inner surface of the windshield 2 can be detected with high precision without using an expensive infrared sensor. Moreover, ceramic print is applied to the portion where the temperature sensor 11 is attached. For this reason, the sensor 11 is invisible from the outside of the vehicle, making unnecessary parts for improving the appearance such as a cover. As a result, a temperature detection device can be inexpensively configured.

(2) In the case where the temperature sensor 11 is attached to a portion farthest away from the defroster outlet port, the sensor 11 is hardly affected by the defroster blow. As a result, it is possible to detect with high precision the occurrence of window fog.

(3) In the case where the temperature sensor 11 is attached on the driver's seat side, the sensor 11 can detect the temperature Tg of the inner surface of the windshield 2 on the driver's seat side more precisely than otherwise. As a result, it is possible to detect with high precision the occurrence of window fog in a region which is important for the driving of the vehicle.

(4) The detected value of the temperature sensor 11 is corrected on the basis of the amount Qsun of solar radiation (Step S5 and Step S7). As a result, it is also possible to detect with high precision the temperature of the inner surface of the windshield 2 in the non-printed portion 2b.

(5) The detected value of the temperature sensor 11 is corrected on the basis of the amount or flow rate QDEF of air blown out from the defroster outlet port and the outlet air temperature Tao (Step S6 and Step S7). As a result, it is possible to detect with high precision the temperature of the inner surface of each point on the windshield 2.

(6) The temperature of the inner surface in a region where ceramic print is applied on the periphery of the windshield 2 is detected, and concurrently the humidity of air in the vicinity of the inner surface of the windshield 2 is also detected. Then, the presence of fog on the windshield 2 is judged, on the basis of these detected values. Accordingly, the presence of the window fog can be detected with high precision. As a result, an unnecessary window defogging operation can be prevented from being performed.

In the embodiment, the temperature sensor 11 is attached to the printed portion 2b and the like on the upper end portion of the windshield 2. However, the position where the temperature sensor 11 is attached is not limited to this, and the position may be changed according to the position and the shape of the defroster outlet port. Moreover, in the embodiment, the temperature sensor 11 is fixed to the housing 10d of the humidity/temperature sensor 10 with the resin film 12 in between, and the sensor unit 1 is engaged with the bracket 15 by using the nails 10b. However, another attachment device may be used for attaching the temperature sensor 11 to the printed portion 2a. Furthermore, although the humidity/temperature sensor 10 as the humidity detector is provided integrally with the temperature sensor 11 in the embodiment, these sensors may be provided separately.

The detected value of the temperature sensor 11 is corrected on the basis of the amount Qsun of solar radiation by a process in the controller 20 as a first correction section. In addition, the detected value of the temperature sensor 11 is corrected also on the basis of the amount or flow rate QDEF of air blown out from the defroster outlet port and the outlet air temperature Tao by a process in the controller 20 as a second correction section. The correction characteristics in this case are not limited to those shown in FIGS. 5A and 5B. Moreover, the occurrence of fog is judged by a process in the controller 20 (Step S8), the configuration of the judging device is not limited to this either. The defogging system may be configured to perform operations other than those above-described examples (a) to (e). The defogging operation is configured to be executed/stopped by turning the fogging flag on/off. The configuration of the controller 20 as a control device is not limited to this.

In the embodiment, a thermistor is used as the temperature sensor 11. However, another type of contact temperature sensor may be used.

The preferred embodiments described herein are illustrative and not restrictive, and the invention may be practiced or embodied in other ways without departing from the spirit or essential character thereof.

The scope of the invention being indicated by the claims, and all variations which come within the meaning of claims are intended to be embraced herein.

The present disclosure relates to subject matters contained in Japanese Patent Application No. 2006-107597, filed on Apr. 10, 2006, the disclosures of which is expressly incorporated herein by reference in its entirety.

What is claimed is:

1. A glass temperature detecting system for detecting a temperature of an inner surface of a windshield of a vehicle, the glass temperature detecting system comprising:
   a contact temperature sensor attached to a printed portion on an upper-side periphery of the windshield on a driver's seat side of a center in a width direction of the windshield, wherein ceramic print is applied to the printed portion where the contact temperature sensor is attached;
   a solar radiation sensor arranged to detect an amount of solar radiation; and
   a first correction section that corrects a detected value of the contact temperature sensor for a difference in temperature between the printed portion where the ceramic print is applied and a non-printed portion where the ceramic print is not applied, to obtain a corrected detected value representing a temperature of an inner surface of the non-printed portion, wherein the first correction section comprises:
      a first correction value calculator that determines a correction value as a function of the amount of solar radiation detected by the solar radiation sensor; and
      a first adder that adds the correction value determined by the first correction value calculator to the detected value of the contact temperature sensor to obtain the corrected detected value.

2. A window fog detecting system for detecting fog on a windshield of a vehicle, comprising:
   the glass temperature detecting system according to claim 1;
   a humidity detection device which detects a humidity of air in a vicinity of the inner surface of the windshield as a detected value; and
   a judging device which judges a presence of fog on the windshield, on a basis of the corrected detected value of the glass temperature detecting system and the detected value of the humidity detection device.

3. An air-conditioning system for a vehicle comprising:
   the window fog detecting system according to claim 2;
   a defogging device which defogs the windshield by using conditioned air blown out from a defroster outlet port; and
   a control device which controls the defogging device according to a detection result of the window fog detecting system.

4. A glass temperature detecting system according to claim 1, wherein the contact temperature sensor is entirely placed on the driver's seat side of the center in the width direction of the windshield.

5. A glass temperature detecting system according to claim 1, wherein no portion of the contact temperature sensor is not placed on the driver's seat side of the center in the width direction of the windshield.

6. A glass temperature detecting system for detecting a temperature of an inner surface of a windshield of a vehicle, the glass temperature detecting system comprising:
   a contact temperature sensor attached to a printed portion on an upper-side periphery of the windshield on a driver's seat side of a center in a width direction of the windshield, wherein ceramic print is applied to the printed portion where the contact temperature sensor is attached;
   a flow rate sensor arranged to detect a flow rate of air blown out from a defroster outlet port;
   an outlet air temperature sensor arranged to detect an outlet air temperature of air blown out from the defroster outlet port; and
   a correction section which corrects a detected value of the contact temperature sensor to obtain a corrected detected value representing the temperature of the inner surface of the windshield, wherein the correction section comprises:
      a correction value calculator that determines a correction value as a function of the flow rate detected by the flow rate sensor and the outlet air temperature detected by the outlet air temperature sensor; and
      an adder that adds the correction value determined by the correction value calculator to the detected value of the contact temperature sensor to obtain the corrected detected value.

7. A glass temperature detecting system for detecting a temperature of an inner surface of a windshield of a vehicle, the glass temperature detecting system comprising:
   a contact temperature sensor attached to a printed portion, where ceramic print is applied, on an upper-side periphery of the windshield, such that the contact temperature sensor is in direct contact with an inner surface of the ceramic print;
   a solar radiation sensor arranged to detect an amount of solar radiation; and
   a first correction section that corrects a detected value of the contact temperature sensor for a difference in temperature between the printed portion where the ceramic print is applied and a non-printed portion where the ceramic print is not applied, to obtain a corrected detected value representing a temperature of an inner surface of the non-printed portion, wherein the first correction section comprises:
      a first correction value calculator that determines a correction value as a function of the amount of solar radiation detected by the solar radiation sensor; and
      a first adder that adds the correction value determined by the first correction value calculator to the detected value of the contact temperature sensor to obtain the corrected detected value.

8. A glass temperature detecting system according to claim 7, wherein the contact temperature sensor is entirely placed on the driver's seat side of the center in the width direction of the windshield.

9. A glass temperature detecting system according to claim 7, wherein no portion of the contact temperature sensor is not placed on the driver's seat side of the center in the width direction of the windshield.

10. A glass temperature detecting system for detecting a temperature of an inner surface of a windshield of a vehicle, the glass temperature detecting system comprising:
    a contact temperature sensor attached to a printed portion, where ceramic print is applied, on an upper-side periphery of the windshield, such that the contact temperature sensor is in direct contact with an inner surface of the ceramic print;

a flow rate sensor arranged to detect a flow rate of air blown out from a defroster outlet port;

an outlet air temperature sensor arranged to detect an outlet air temperature of air blown out from the defroster outlet port; and a correction section which corrects a detected value of the contact temperature sensor to obtain a corrected detected value representing the temperature of the inner surface of the windshield, wherein the correction section comprises:

a correction value calculator that determines a correction value as a function of the flow rate detected by the flow rate sensor and the outlet air temperature detected by the outlet air temperature sensor; and an adder that adds the correction value determined by the correction value calculator to the detected value of the contact temperature sensor to obtain the corrected detected value.

11. A window fog detecting system for detecting fog on a windshield of a vehicle, the window fog detecting system comprising:

the glass temperature detecting system according to claim 7;

a humidity detection device which detects a humidity of air in a vicinity of the inner surface of the windshield as a detected value; and a judging device which judges a presence of fog on the windshield, on a basis of the corrected detected value of the glass temperature detecting system and the detected value of the humidity detection device.

12. An air-conditioning system for a vehicle comprising:

the window fog detecting system according to claim 11;

a defogging device which defogs the windshield by using conditioned air blown out from a defroster outlet port; and a control device which controls the defogging device according to a detection result of the window fog detecting system.

13. A window fog detecting method of detecting fog on a windshield of a vehicle, the method comprising:

detecting a temperature of an inner surface of the windshield with any one of:

a contact temperature sensor attached to a printed portion on an upper-side periphery of the windshield on a driver's seat side of a center in a width direction of the windshield, wherein ceramic print is applied to the printed portion where the contact temperature sensor is attached, and a contact temperature sensor attached to a printed portion, where ceramic print is applied, on an upper-side periphery of the windshield, such that the contact temperature sensor is in direct contact with an inner surface of the ceramic print;

detecting a humidity of air in a vicinity of the inner surface of the windshield with a humidity detection device;

detecting a temperature of air in the vicinity of the inner surface of the windshield with an air temperature sensor;

detecting an amount of solar radiation with a solar radiation sensor;

correcting, with a first correction section, a detected value of the contact temperature sensor, for a difference in temperature between the printed portion where the ceramic print is applied and a non-printed portion where the ceramic print is not applied to obtain a corrected detected value representing a temperature of an inner surface of the non-printed portion, wherein correcting the detected value of the contact temperature sensor comprises:

determining a correction value as a function of the amount of solar radiation detected by the solar radiation sensor with a first correction value calculator; and adding the correction value determined by the first correction value calculator to the detected value of the contact temperature sensor to obtain the corrected detected value with a first adder; and judging, with a judging device, a presence of fog on the windshield, on a basis of the corrected detected value of the inner surface of the windshield, and a detected temperature and humidity of air in a vicinity of the inner surface of the windshield.

* * * * *